(12) United States Patent
Morris et al.

(10) Patent No.: US 9,213,818 B2
(45) Date of Patent: Dec. 15, 2015

(54) ANONYMOUS AUTHENTICATION USING BACKUP BIOMETRIC INFORMATION

(71) Applicant: Partnet, Inc., Salt Lake City, UT (US)

(72) Inventors: Cameron Craig Morris, Saratoga Springs, UT (US); Douglas M. Erickson, Centerville, UT (US)

(73) Assignee: Partnet, Inc., Salt Lake City, UT (US)

( * ) Notice: Subject to any disclaimer, the term of this patent is extended or adjusted under 35 U.S.C. 154(b) by 6 days.

(21) Appl. No.: 14/188,265

(22) Filed: Feb. 24, 2014

(65) Prior Publication Data

US 2015/0242607 A1    Aug. 27, 2015

(51) Int. Cl.
*H04L 29/06* (2006.01)
*G06F 21/32* (2013.01)
*H04L 9/32* (2006.01)

(52) U.S. Cl.
CPC .............. *G06F 21/32* (2013.01); *H04L 9/321* (2013.01); *H04L 63/0861* (2013.01)

(58) Field of Classification Search
CPC ...................................................... G06F 21/32

USPC ......................................................... 713/186
See application file for complete search history.

(56) References Cited

U.S. PATENT DOCUMENTS 8,127,143 B2 *   2/2012   Abdallah et al. ............... 713/186
8,583,454 B2 *  11/2013   Beraja et al. ........................ 705/2

* cited by examiner

*Primary Examiner* — Longbit Chai
(74) *Attorney, Agent, or Firm* — Austin Rapp & Hardman

(57) ABSTRACT

A method for performing anonymous authentication by an electronic device is described. The method includes obtaining biometric data. The method also includes enrolling biometric information based on the biometric data. The method also includes generating backup biometric information based on the biometric data. The backup biometric information includes a backup biometric template. The method also includes generating a backup public key and a backup private key. The method also includes enrolling the backup biometric information. Enrolling the backup biometric information includes distributing the backup biometric template, the backup public key and the backup private key among different entities.

16 Claims, 10 Drawing Sheets

ANONYMOUS AUTHENTICATION USING BACKUP BIOMETRIC INFORMATION

TECHNICAL FIELD

The present disclosure relates generally to communication systems. More specifically, the present disclosure relates to systems and methods for anonymous authentication using backup biometric information.

BACKGROUND

Communications systems are widely deployed to provide various types of communication content such as voice, video, data and so on. These systems increase productivity, communication and the availability of information.

As communication systems expand, many people are able to gain access to valuable information. However, the structures of communication systems, such as the Internet and other networks, also create potential problems. In many cases, people often decide between accuracy of information and privacy. For example, a person may be able to access sensitive data, but may have to sacrifice anonymity to do so. On the other hand, a person may be able to stay anonymous, but may not be able to access sensitive information as a result. Therefore, systems and methods that improve authentication may be beneficial.

DETAILED DESCRIPTION

Figure 1:
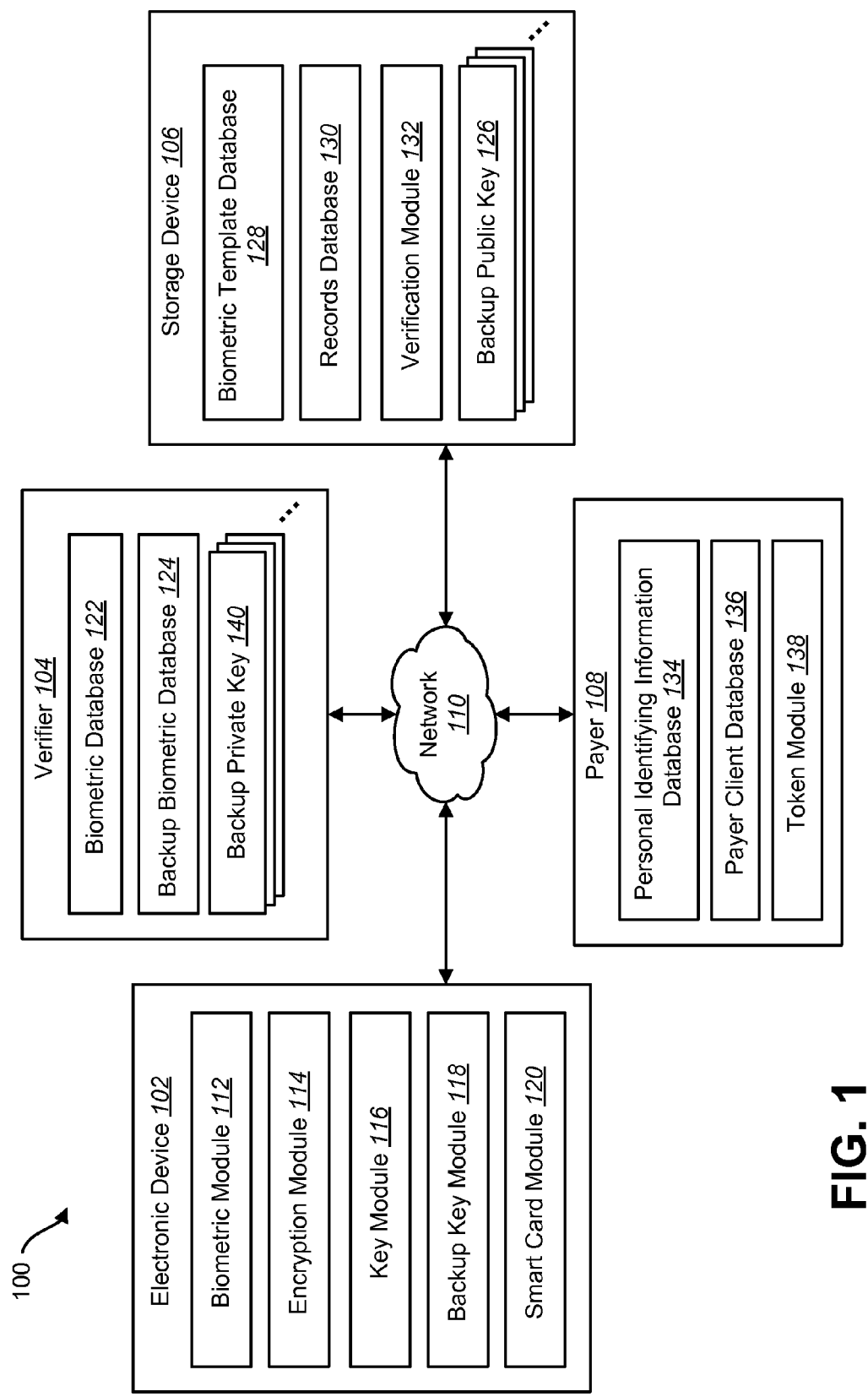
FIG. 1 is a block diagram illustrating one configuration of a system for performing anonymous authentication using backup biometric information.

A method for performing anonymous authentication by an electronic device is described. The method includes obtaining biometric data. The method also includes enrolling biometric information based on the biometric data. The method also includes generating backup biometric information based on the biometric data. The backup biometric information includes a backup biometric template. The method also includes generating a backup public key and a backup private key. The method also includes enrolling the backup biometric information. Enrolling the backup biometric information includes distributing the backup biometric template, the backup public key and the backup private key among different entities.

Enrolling backup biometric information may also include sending the backup biometric template and the backup private key to a verifier. Enrolling backup biometric information may also include sending a backup public key and an encrypted backup biometric template based on the backup biometric template to a storage device. Enrolling backup biometric information may also include sending personal identifying information (PII) corresponding to the backup biometric data to a payer.

The method may also include obtaining additional biometric data. The method may also include obtaining PII of a patient corresponding to the additional biometric data. The method may also include verifying a patient identity based on the additional biometric data and the PII of the patient. Verifying the patient identity may include comparing the additional biometric data to the backup biometric template stored on the verifier. Verifying the patient identity may also include receiving the backup private key from the verifier based on comparing the additional biometric data to the backup biometric template. The method may also include verifying the patient identity by comparing the PII of the patient with PII stored on a payer.

The method may also include obtaining privacy sensitive information from a storage device based on verifying the patient identity. Obtaining privacy sensitive information may include receiving a first token from a payer. Obtaining privacy sensitive information may also include verifying the first token with a second token on the storage device. The method may also include receiving one or more encrypted biometric templates from the storage device based on the PII of the patient. The method may also include verifying a matching backup biometric template by decrypting one of the one or more encrypted biometric templates using the backup private key. The method may also include providing an indication of the matching biometric template to the storage device. The method may also include obtaining privacy sensitive information corresponding to the matching backup biometric template.

The method may also include generating a first partial backup private key and a second partial backup private key. Enrolling the backup biometric information may include distributing the first partial backup private key to a verifier and the second partial backup private key to a payer.

An electronic device for performing anonymous authentication is also described. The electronic device includes a processor and memory in electronic communication with the processor. The electronic device also include instructions stored in memory. The instructions are executable to obtain biometric data. The instructions are also executable to enroll biometric information based on the biometric data. The instructions are also executable to generate backup biometric information based on the biometric data. The backup biometric information includes a backup biometric template. The instructions are also executable to generate a backup public key and a backup private key. The instructions are also executable to enroll the backup biometric information. Enrolling the backup biometric information includes distributing the backup biometric template, the backup public key and the backup private key among different entities.

A computer-program product for performing anonymous authentication is also described. The computer-program product includes a non-transitory computer-readable medium having instructions thereon. The instructions include code for causing an electronic device to obtain biometric data. The instructions also include code for causing the electronic device to enroll biometric information based on the biometric data. The instructions also include code for causing the electronic device to generate backup biometric information based on the biometric data. The backup biometric information includes a backup biometric template. The instructions also include code for causing the electronic device to generate a backup public key and a backup private key. The instructions also include code for causing the electronic device to enroll the backup biometric information. Enrolling the backup biometric information includes distributing the backup biometric template, the backup public key and the backup private key among different entities.

The systems and methods described herein include an electronic device for performing anonymous authentication using backup biometric information. This authentication may be used in obtaining information (e.g., privacy sensitive information) about an individual (e.g., a patient) associated with backup biometric information. For example, health care providers (e.g., hospitals, clinics, insurance companies, etc.) and other organizations depend on accurate information about patients, including histories and identities of patients in providing the best health care possible. However, there is also an interest in preserving the privacy of patients that may limit the availability of accurate patient information.

In some configurations, patient privacy and accurate information may be obtained by programming a smart card with one or more keys for encrypting and/or decrypting biometric information that may be used to authenticate the identity of a patient when obtaining privacy sensitive information about a patient. However, where the smart card is the only source of certain keys or other information for authenticating the identity of a patient and/or for obtaining privacy sensitive information, it may be difficult to recover accurate information while maintaining the anonymity of a patient (if the smart card is lost, for example). Therefore, in addition to generating and enrolling biometric information, backup biometric information may be obtained and stored in such a way that the backup keys and/or backup biometric information may be used in obtaining privacy sensitive information while still maintaining a reasonable expectation of privacy for a patient. Thus, even in cases where some biometric information is not available (e.g., no smart card), anonymous authentication may be performed while still permitting access to privacy sensitive information about a patient and preserving the anonymity of a patient.

Although some of the systems and methods are described in relation to health care patients and associated medical records, the systems and methods may be applied to a wide variety of individuals and various types of information associated with those individuals. Therefore, as used herein, a "patient" may include a patient requesting health treatment or any person associated with biometric information, tokens, signatures, identification numbers and records on a storage device. Further, "records" on a storage device may refer to any kind of information (e.g., privacy sensitive information) for which access may be restricted by an individual with an interest in access to or the distribution of that information. Further, as used herein, a "storage device" may include a health database system, including a database of medical records and/or other privacy sensitive information. In one configuration, a storage device may be a medical record and patient security (MRPS) system. Additionally or alternatively, a "storage device" may include one or more storage devices in some configurations, including one or more devices and/or a cloud computing space. Therefore, as used herein, a "storage device" may refer to one or more storage devices or other system capable of storing data (e.g., biometric information, patient identification information, privacy sensitive information). Moreover, performing anonymous authentication using backup information may be done in connection with other methods of storing, encrypting, verifying uniqueness and/or authenticating biometric information on a storage device.

Moreover, the systems and methods described herein may relate to performing anonymous authentication using backup biometric information. As used herein, "biometric information" may include biometric data and/or biometric template(s). Biometric information may be encrypted or not encrypted. Further, backup biometric information may refer to biometric data and/or backup biometric template(s) (based on the biometric data, for example) or other information used when performing anonymous authentication using backup biometric information. Backup biometric information may be encrypted or not encrypted. In some configurations, a system may generate and enroll biometric information and separate backup biometric information that share similar features. For example, biometric information and backup biometric information may be obtained using the same biometric data. Alternatively, biometric information and backup biometric information may be obtained using different biometric data (e.g., biometric data obtained using separate scans).

Various configurations are now described with reference to the figures, where like reference numbers may indicate functionally similar elements. The systems and methods as generally described and illustrated in the figures herein could be arranged and designed in a wide variety of different configurations. Thus, the following more detailed description of several configurations, as represented in the figures, is not intended to limit scope, as claimed, but is merely representative of the systems and methods. As used herein, the term "plurality" may indicate two or more. For example, a plurality of components refers to two or more components.

FIG. 1 is a block diagram illustrating one configuration of a system 100 for performing anonymous authentication using backup biometric information. The system 100 may include an electronic device 102, a storage device 106 (e.g., one or more storage devices), a verifier 104 and a payer 108 that communicate using a network 110. Examples of an electronic device 102 may include servers, personal computers (PCs), laptop computers, tablet devices, smartphones or other kinds of electronic or computing devices. The electronic device 102 may be controlled by a user and/or a health care provider. The storage device 106 may also include one or more similar electronic or computing devices as the electronic device 102. In one configuration, the storage device 106 may be implemented as a medical record patient security system (MRPS). Additionally, the verifier 104 may include one or more similar electronic or computing devices as the electronic device 102. In one configuration, the verifier 104 may be implemented as an anonymous biometric cloud (ABC) for storing biometric information unrelated to self-identifying information. Further, the payer 108 may also include one or more similar electronic or computing devices as the electronic device 102. In some configurations, the payer 108 may be controlled by a paying entity (e.g., an insurance company or other individual).

The system 100 may be used for performing anonymous authentication using backup biometric information. For example, an electronic device 102 may obtain biometric data and enroll biometric information and backup biometric information based on the biometric data. The biometric information may be enrolled by programming a smart card using some of the biometric information (e.g., public and private keys). The backup biometric information may be enrolled by distributing the backup biometric information among different entities (e.g., the verifier 104, the storage device 106 and the payer 108). For example, the electronic device 102 may enroll backup biometric information by sending a backup private key and a backup biometric template to a verifier 104, a backup public key and an encrypted backup biometric template to a storage device 106, and personal identifying information (PII) to a payer 108. In cases where some of the original biometric information is unavailable (e.g., the smart card is lost), the backup biometric information may be used for performing anonymous authentication. The electronic device 102 may be used to obtain additional biometric data and PII of a patient and perform anonymous authentication using the PII on the payer 108 and backup biometric information previously distributed among the different devices in the system 100. For example, the electronic device 102 may receive a backup private key from the verifier and use the backup key pair to decrypt an encrypted backup biometric template received from the storage device 106. The electronic device 102 may then receive privacy sensitive information from the storage device 106 based on the anonymous authentication using the backup biometric information and backup keys. Each of the electronic device 102, verifier 104, storage device 106 and payer 108 are described in more detail below. Further, an example of performing anonymous authentication using backup biometric information is described in additional detail below in connection with FIG. 9.

The electronic device 102, verifier 104, storage device 106 and payer 108 may communicate over a network 110. The network 110 may be a computer network such as a Local Area Network (LAN), Wide Area Network (WAN), Public Switched Telephone Network (PSTN), cellular phone network, the Internet, an intranet and/or other medium that may be used for transferring data between the electronic device 102, verifier 104, storage device 106 and/or payer 108.

The electronic device 102 may include a biometric module 112. The biometric module 112 may be a hardware and/or software module used to obtain biometric data and perform one or more operations on the biometric data. For example, the biometric module 112 may include hardware and/or software for scanning or capturing biometric data from a patient. Biometric data may be obtained through a variety of techniques, including a palm vein scan, palm print, fingerprint, retinal scan, face recognition scan, blood sample or other method for capturing data that may be used to identify a patient. In some configurations, the biometric module 112 may obtain multiple types of biometric data from a single patient. The biometric module 112 may be implemented as part of the electronic device 102 and/or on a remote device in communication with the electronic device 102. In one example, the biometric module 112 may receive biometric data from a device (e.g., palm vein scanner) that is coupled to the electronic device 102.

The biometric module 112 may also include hardware and/or software for generating a biometric template and a backup biometric template based on the biometric data. For example, the biometric module 112 may generate a first biometric template and a backup biometric template based on the same biometric data. Further, the biometric template and the backup biometric template may share similar features. Thus, the features described herein with regard to the biometric template based on the biometric data may also be features of the backup biometric template based on the biometric data. In some configurations, the backup biometric information is obtained using different biometric data (e.g., biometric data obtained using separate scans).

A biometric template may include any details of the biometric data for determining a match between the biometric template and the biometric data. The biometric template may be a digital representation of the biometric data itself. In some configurations, the biometric template may be generated as a reduced or compressed version of the biometric data. For example, the biometric template may be a parameterized representation of the biometric data (e.g., characteristics of the biometric data such as sizes, distances, features and/or numbers of features, etc.). For instance, in the case of biometric data being obtained through a fingerprint, the biometric template may include any data that can be utilized for matching a subsequent fingerprint with the biometric template. Thus, the biometric template or backup biometric template may include any data for determining a match between the biometric data of a patient and the biometric template created by the biometric module 112. In some configurations, the biometric template may be a reduced version of the biometric data, including a portion of the biometric data that may be used in determining a match between the biometric template and subsequently obtained biometric data (e.g., additional biometric data). A biometric template and backup biometric template may be generated for a patient the first time a patient provides biometric data or when enrolling biometric information and backup biometric information with a storage device 106, health care provider or other entity. The biometric template may be stored and later used when comparing the biometric template to subsequently obtained biometric data and further verifying a patient identity.

The electronic device 102 may include an encryption module 114, a key module 116 and a backup key module 118. The encryption module 114 may be a hardware and/or software module used to encrypt one or more biometric templates. The key module 116 and backup key module 118 may be hardware and/or software modules used for generating one or more key pairs (e.g., original key pairs or backup key pairs) for encrypting and/or decrypting biometric information and backup biometric information. The encryption module 114, key module 116 and backup key module 118 may each be included within the electronic device 102 or alternatively implemented as part of separate devices.

The electronic device 102 may also include a smart card module 120. The smart card module 120 may be a hardware and/or software module for programming a smart card. The smart card module 120 may be included within the electronic device 102 or alternatively implemented as part of a separate device. The smart card module 120 may obtain one or more public and private keys and program a smart card by storing a public and private key on the smart card that corresponds to a biometric template (e.g., encrypted biometric template). The smart card may later be used to provide the private key stored on the smart card for identifying and/or decrypting an encrypted biometric template.

The verifier 104 may include a biometric database 122, backup biometric database 124 and one or more stored backup private keys 140. The biometric database 122 may be used to store biometric information based on biometric data obtained by the electronic device 102. In some configurations, the biometric database 122 may include multiple biometric templates corresponding to biometric data obtained from various patients. The biometric database 122 may be used when enrolling biometric information by verifying whether a patient providing biometric data is already enrolled or not.

The verifier 104 may also include a backup biometric database 124. The backup biometric database 124 may be used to store multiple backup biometric templates corresponding to multiple patients. In one configuration, the backup biometric templates stored in the backup biometric database are unencrypted. Thus, each of the backup biometric templates may be compared to and matched with additional biometric data (e.g., subsequently obtained biometric data) without the use of any decryption tools (e.g., backup private key).

The verifier 104 may receive and store backup private keys 140. Each backup private key 140 may correspond to a backup biometric template on the backup biometric database 124. The verifier 104 may receive each backup private key 140 and corresponding biometric templates from the electronic device 102. The verifier 104 may store the backup private key and provide one or more backup private keys 140 on request from the electronic device 102. In some configurations, the electronic device 102 may request a backup private key 140 based on additional biometric data, and the verifier 104 provides the backup private key 140 corresponding to a biometric template that matches the additional biometric data.

The storage device 106 may include a biometric template database 128. The biometric template database 128 may store encrypted backup biometric templates (received from the electronic device 102, for example). In some configurations, the biometric template database 128 may also store one or more backup public keys 126 corresponding to the backup biometric templates. Thus, each encrypted backup biometric template may be stored centrally on a storage device 106 on a record-by-record basis with an accompanying backup public key.

The storage device 106 may also include a records database 130. The records database 130 may be used to store privacy sensitive information. In one configuration, the privacy sensitive information may include records (e.g., medical records) of patients. In some configurations, the privacy sensitive information is encrypted. The privacy sensitive information may also be linked to a corresponding biometric template (e.g., an encrypted backup biometric template). In some configurations, the identity of a patient corresponding to or having access to the privacy sensitive information may be obtained by decrypting an encrypted backup biometric template linked to the privacy sensitive information. Thus, with or without encrypting the privacy sensitive information, the identity of one or more patients associated with the privacy sensitive information may be difficult or impossible to determine without the use of a backup private key 140 because the privacy sensitive information may be anonymized.

The storage device 106 may also include a verification module 132. The verification module 132 may be a hardware and/or software module used to verify or authenticate a signature or token from an electronic device 102. For example, the verification module 132 may be used to verify a match between a token received at the storage device 106 and another token provided by the electronic device 102 or other computing device. Further, the verification module 132 may be used for receiving and verifying one or more backup public and/or private keys that may be used when authenticating a request for privacy sensitive information or for determining a match between an encrypted backup biometric template and privacy sensitive information (e.g., medical records) stored on the records database 130.

It is noted that in some configurations, the biometric template database 128 and the records database 130 may be located on separate storage devices 106. For example, the records database 130 may be stored on a storage device 106 associated with a healthcare provider, while the biometric template database 128 may be stored on a separate storage device 106 associated with a third party.

The payer 108 may be used to assist in performing anonymous authentication where an original private/public key pair is unavailable. For example, where a patient has lost or is not currently in possession of a smart card, the payer 108 may be used to perform verification of a patient identity based on personal identifying information (PII) about a patient. The payer 108 may include a personal identifying information (PII) database 134 including PII about various patients that have previously registered or enrolled with the payer 108. The PII may be stored in the PII database 134 upon enrollment of a patient in the system. The PII database 134 may include various types of information about one or more patients, including demographic information or other self-identifying information independent from the biometric information. Examples of PII information may include name, address, location, gender, age, ethnicity or other demographic information that may be used or readily provided for verifying the identity of a patient. Additionally, PII information may include other self-identifying information, such as a social security number (SSN), employer or other information to identify or narrow a range of possible candidates corresponding to the patient identity. It is noted that, in some configurations, PII does not include biometric information about a patient. Thus, the PII database 134 may include various types of data corresponding to a patient identity other than biometric information. It is also noted that the payer 108 may be the only entity in the system where PII is stored.

The payer 108 may include a payer client database 136. The payer client database 136 may include identification numbers, account numbers and/or other information that may be used to identify a patient without revealing the name or identity of a patient. Clients from the payer client database 136 may be linked to PII from the PII database 134. In some configurations, the payer 108 may generate a list of candidate clients from the payer client database 136 based on PII of a patient later provided to the payer 108. The list of candidate clients may be a list of client numbers or other account identification that matches or narrows a list of clients based on the PII of a patient that is provided to the payer 108.

The payer 108 may also include a token module 138. The token module 138 may be a hardware and/or a software module used to generate one or more tokens. A token generated using the token module 138 may be a one-time use token for authenticating a relationship or verifying a communication between the electronic device 102 and the payer 108 or storage device 106. For example, the token module 138 may generate two corresponding tokens. A first token may be provided to the electronic device 102 while a second token is provided to the storage device 106. The electronic device 102 and the storage device 106 may use the tokens to confirm a communication or relationship with the payer 108 in establishing trust between the electronic device 102 and the storage device 106.

In performing anonymous authentication, each of the electronic device 102, verifier 104, storage device 106 and the payer 108 may communicate over a network 110. Performing authentication may include enrolling biometric information and backup biometric information. A patient may also be enrolled with a payer 108 by providing PII, either at the same time as enrolling the biometric information or at a different (e.g., earlier) time. Enrolling biometric information may include generating and distributing a public key, private key and biometric template. The biometric template may be stored on a verifier 104 and the public key and private key may be stored on a smart card. The electronic device 102 may also encrypt the biometric template and the biometric template may be stored on a storage device 106. In obtaining access to privacy sensitive information (or other information on a records database 130) on the storage device 106, a patient may provide the public key and/or private key using the smart card, decrypt the encrypted biometric template and obtain access using the public and private key pair stored on the smart card. It is noted that the backup public key 126, backup private key 140 and backup biometric information is not stored on the smart card. Further, it is also noted that in some configurations, the only copy of a private key and public key may be stored on the smart card. Thus, if the smart card is lost, it may be difficult or impossible to obtain access to privacy sensitive information (or other data on the records database 130) that is linked to biometric information that is encrypted according to the public/private key pair on the smart card.

The electronic device 102 may also enroll backup biometric information. For example, where the smart card is not accessible or lost by a patient, the backup biometric information may be used as an alternative to the smart card in verifying the identity of a patient and authenticating access to privacy sensitive information. Enrolling backup biometric information may include generating and distributing a backup biometric template based on the biometric data, a backup public key 126 and a backup private key 140. The backup private key 140 and backup biometric template may be sent to and stored on the verifier 104. The backup biometric template may be encrypted and sent to the storage device 106. The backup public key 126 may also be sent to the storage device 106. Further, personal identifying information (PII) may be stored on the payer 108 at the time of enrollment or at another time when enrolling or registering PII with the payer 108. Thus, enrolling the backup biometric information may include distributing the biometric information, PII and key pairs among multiple entities (e.g., the verifier 104, the storage device 106 and the payer 108).

In some configurations, enrolling the backup biometric information may also include generating one or more partial keys. For example, the backup key module 118 may be used to generate a first partial private key and a second partial private key. The first partial private key may be stored on a first device (e.g., the verifier 104) and the second partial private key may be stored on a second device (e.g., the payer 108). In some configurations, additional partial private keys may be generated, each partial private key making up a part of the backup private key 140 that may be used to decrypt an encrypted biometric template according to a corresponding backup public key 126. In some configurations, an encrypted backup biometric template is unable to be decrypted without each of the partial private keys.

By enrolling backup information and providing PII to a payer 108, it is possible to authenticate the identity of a patient while simultaneously protecting the anonymity of a patient. For example, by distributing the backup public key 126, backup private key 140, privacy sensitive information and PII among three different entities, the identify of a patient may be protected. Further, because the private key is stored on the verifier 104 and the PII is stored with a separate payer 108, a patient may have a reasonable expectation of privacy as the privacy sensitive records may not be obtained without first verifying additional biometric data with the verifier 104 in addition to verifying PII with the payer 108 prior to obtaining privacy sensitive information from the storage device 106.

Figure 2:
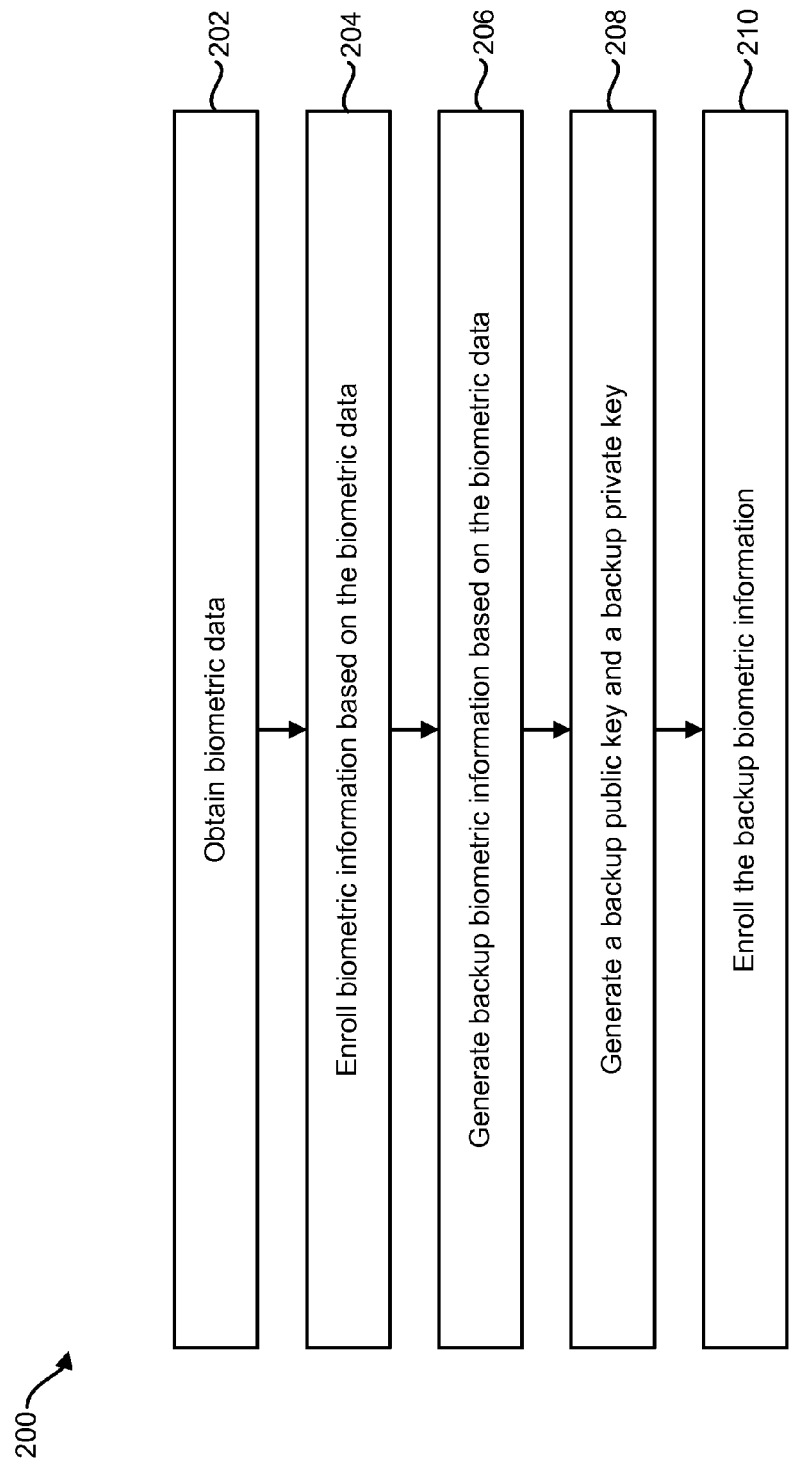
FIG. 2 is a flow diagram illustrating one configuration of a method for enrolling biometric information and backup biometric information.

FIG. 2 is a flow diagram illustrating one configuration of a method 200 for enrolling biometric information and backup biometric information. The method 200 may be performed by an electronic device 102 (e.g., computing device, server, smart phone, etc.).

An electronic device 102 may obtain 202 biometric data. The biometric data may be obtained 202 using a variety of devices and techniques. For example, biometric data may be obtained 202 using a fingerprint scanner, a thumbprint scanner, a handprint or palm scanner, a vein scanner (e.g., a palm vein scanner), an eye scanner or other device capable of capturing data that may be used to identify a person. The biometric data may include information or data that may be used in verifying the identity of a patient associated with the biometric data. Example of biometric data may include fingerprints, palm prints, vein scans or other types of data for identifying a patient. In some configurations, multiple types of biometric data may be obtained for each patient.

The electronic device 102 may enroll 204 biometric information based on the biometric data. Enrolling 204 biometric information may include generating one or more biometric templates based on the obtained biometric data. Enrolling 204 biometric information may also include generating one or more public and private keys and encrypting biometric templates using the public key. The biometric information may be stored on the electronic device 102 or other computing device (e.g., storage device 106, verifier 104). Further, enrolling the biometric information may include programming a smart card by storing one or more public and private key combinations on the smart card.

The electronic device 102 may generate 206 backup biometric information based on the biometric data. In some configurations, the backup biometric information is generated 206 based on the same biometric data as the enrolled biometric information. The backup biometric information may include a backup biometric template generated based on the biometric data. The electronic device 102 may also generate 208 a backup public key 126 and a backup private key 140. The backup public key 126 may correspond to the backup private key 140. The backup public key 126 may be used to encrypt a backup biometric template.

The electronic device 102 may enroll 210 the backup biometric information. Enrolling 210 the backup biometric information may include similar steps as enrolling the biometric information based on the biometric data. Further, enrolling 210 the backup biometric information may include distributing the backup biometric template, the backup public key 126 and the backup private key 140 among different entities over a network 110. Further, the encrypted backup biometric template may be distributed over the network 110. In one example, the backup biometric information is distributed among a verifier 104, storage device 106 and a payer 108. For example, a backup private key 140 and a backup biometric template may be sent to a verifier 104. Further, personal identifying information (PII) may be sent to a payer 108. Also, an encrypted backup biometric template may be sent to a storage device 106. The backup public key 126 may also be sent to the storage device 106. In some configurations, the backup biometric information and backup key pair may be sent to and stored on one or more additional electronic or computing devices.

Figure 3:
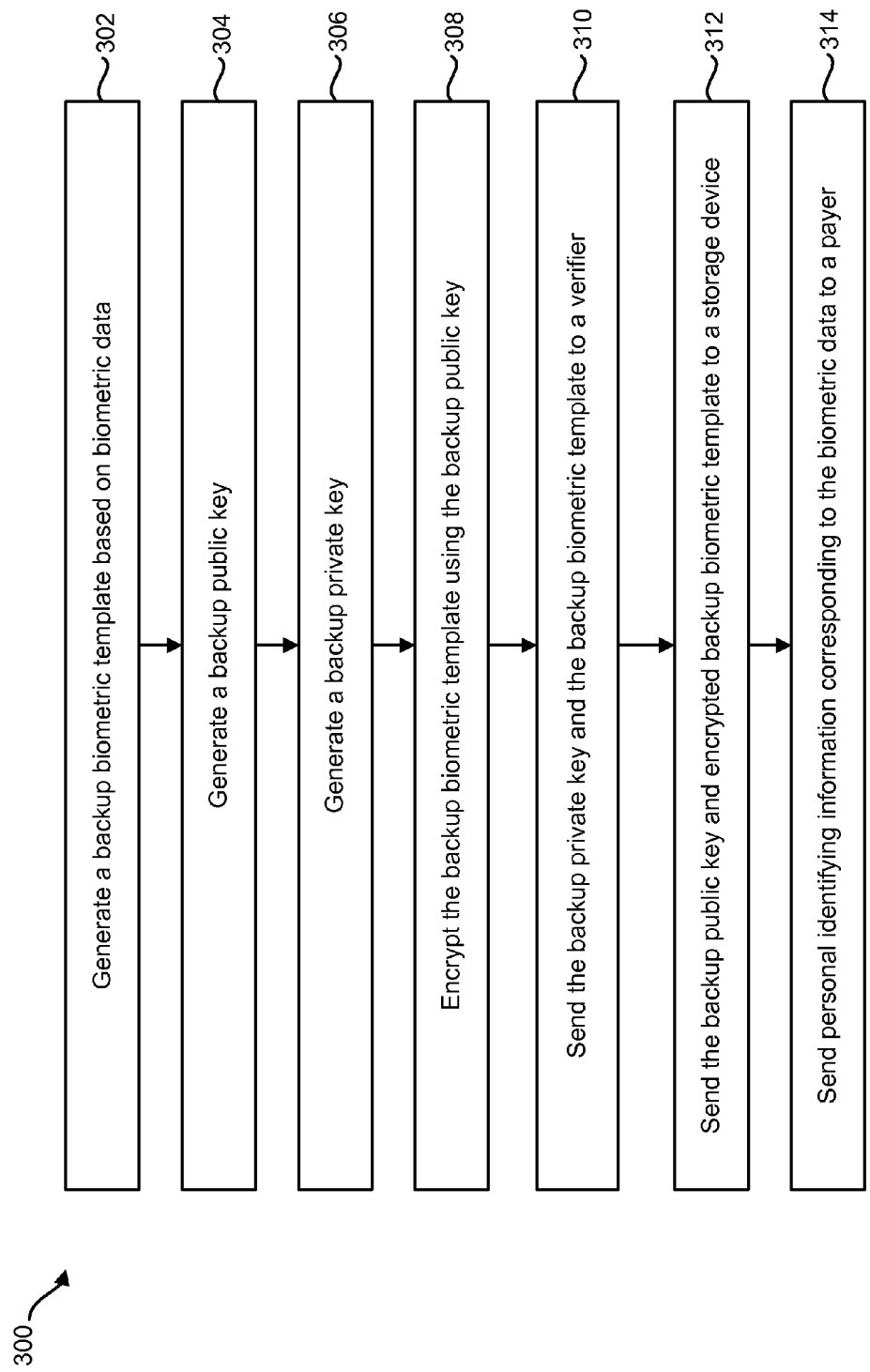
FIG. 3 is a flow diagram illustrating one configuration of a method for generating and enrolling backup biometric information.

FIG. 3 is a flow diagram illustrating one configuration of a method 300 for generating and enrolling backup biometric information. In one configuration, the method 300 may be performed by an electronic device 102 or other computing device.

An electronic device 102 may generate 302 a backup biometric template based on the biometric data. The backup biometric template may include details of biometric data for determining a match between the backup biometric template and subsequently obtained biometric data (e.g., additional biometric data). For example, the backup biometric template may be used to later identify a patient who subsequently provides additional biometric data by comparing the backup biometric template and the additional biometric data.

The electronic device 102 may generate 304 a backup public key 126. The electronic device 102 may also generate 306 a backup private key 140. The backup public key 126 and backup private key 140 make up a backup key pair for encrypting and/or decrypting biometric information (e.g., a backup biometric template). The electronic device 102 may also encrypt 308 the backup biometric template using the backup public key 126. Further, it is noted that generating 302 the backup biometric template based on biometric data, generating 304 the backup public key 126, generating 306 the backup private key 140 and encrypting 308 the backup biometric template using the backup public key 126 may be one configuration of generating 206 backup biometric information based on the biometric data described above in connection with FIG. 2.

The electronic device 102 may send 310 the backup private key 140 and the backup biometric template to a verifier 104. The electronic device 102 may also send 312 the encrypted backup biometric template to a storage device 106. Further, the electronic device 102 may send 314 personal identifying information (PII) corresponding to the biometric data to a payer 108. Further, this biometric information and key pairs distributed among the verifier 104, storage device 106 and payer 108 may be transmitted over a common or different networks. Further, it is noted that sending 310 the backup private key 140 and the backup biometric template to the verifier 104, sending 312 the encrypted backup biometric template to the storage device 106 and sending 314 the PII corresponding to the biometric data to the payer 108 may be one configuration of enrolling 208 the backup biometric information described above in connection with FIG. 2.

Figure 4:
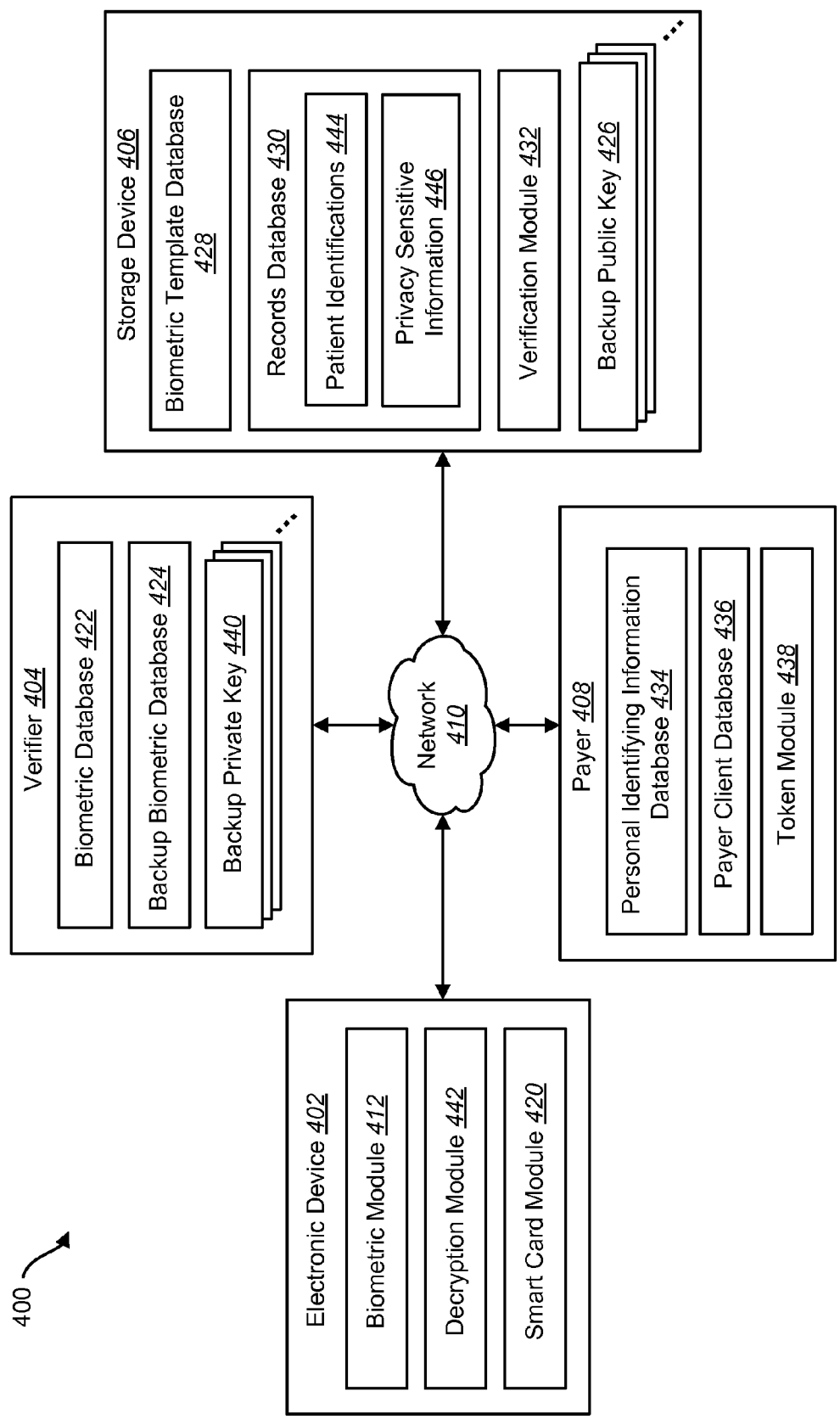
FIG. 4 is a block diagram illustrating one configuration of a system for authenticating additional biometric data using backup biometric information.

FIG. 4 is a block diagram illustrating one configuration of a system 400 for authenticating additional biometric data using backup biometric information. In some configurations, one or more of the devices included in the system 400 of FIG. 4 may be similar to or different from corresponding devices described above in connection with FIG. 1.

The electronic device 402 may include a biometric module 412, a decryption module 442 and a smart card module 420. The biometric module 412 and the smart card module 420 may be similar to the biometric module 112 and smart card module 120 described in FIG. 1. Further, the biometric module 412 may be used to obtain additional biometric data from a patient. For example, a patient who has previously enrolled backup biometric information with the electronic device 402, verifier 404, payer 408 and/or storage device 406 may provide additional biometric data (at a later time, for example), which is compared to backup biometric data previously enrolled.

The electronic device 402 may also include a decryption module 442. The decryption module 442 may be used to decrypt an encrypted backup biometric template received from the storage device 406. For example, the electronic device 402 may obtain a previously distributed encrypted biometric template from the storage device 406. The electronic device 402 may also obtain a corresponding backup private key 440 from the verifier 404. Using the decryption module 442, the electronic device 402 may verify that a backup biometric template matches additional biometric data by successfully decrypting the encrypted backup biometric template received from a storage device 406.

The verifier 404 may include a biometric database 422, a backup biometric database 424 and one or more backup private keys 440. The biometric database 422, backup biometric database 424, backup public keys 426 and backup private keys 440 may be similar to the biometric database 122, backup biometric database 124 and backup private keys 140 described above in connection with FIG. 1.

The payer 408 may include a personal identifying information (PII) database 434, a payer client database 436 and a token module 438. The PII database 434, the payer client database 436 and the token module 438 may be similar to the PII database 134, payer client database 136 and token module 138 described above in connection with FIG. 1.

The storage device 406 may include a biometric template database 428, a records database 430, a verification module 432 and backup public keys 426. The biometric template database 428, records database 430, verification module 432 and backup public keys 426 may be similar to the biometric template database 128, records database 130, verification module 132 and backup public keys 126 described above in connection with FIG. 1. Further, the records database 430 may include patient identifications 444 and privacy sensitive information 446. Patient identifications 444 may include patient numbers, signatures, insurance identification data or other information that may identify a patient and/or link privacy sensitive information 446 to anonymous patient data. The records database 430 may include privacy sensitive information 446 corresponding to various patients (e.g., via corresponding biometric templates). The privacy sensitive information 446 may be personal data, medical records or other information that a patient may want to remain private or anonymous. Further, the privacy sensitive data 446 may be indexed or linked to one or more patients that have permission to access the privacy sensitive information 446. In some configurations, the privacy sensitive information 446 may be encrypted and linked to a corresponding backup biometric template. The storage device 406 may have a backup public key 426 for each account (e.g., from the payer client database 436). Thus, when a list of candidates are provided from the payer 408 to the storage device 406, the storage device 406 may generate a list of backup biometric templates and challenge whether an electronic device 402 has access to a backup private key 440 that corresponds to a particular account. In another configuration, the privacy sensitive information 446 may be unencrypted, but linked to an encrypted backup biometric template. Thus, even if unencrypted, the privacy sensitive information 446 may be anonymous.

The system 400 may be implemented to authenticate additional biometric data to obtain privacy sensitive information 446 from a storage device 406. In one configuration, the electronic device 402 may be managed or controlled by a health care provider (e.g., health clinic) or other entity seeking access to up-to-date privacy sensitive information 446 corresponding to a particular patient. The electronic device 402 may use the biometric module 412 to obtain additional biometric data from a patient. Obtaining additional biometric data may be similar to obtaining biometric data described above in connection with FIG. 1 (e.g., scanning a handprint, thumbprint, etc.). The additional biometric data may be compared to previously obtained/enrolled biometric information distributed to other devices on the system 400.

In one configuration, the additional biometric data is provided to a verifier 404 to compare the additional biometric data to backup biometric information stored on a backup biometric database 424 stored on the verifier 404. If the additional biometric data matches a backup biometric template on the backup biometric database 424, the verifier 404 may send a and backup private key 440 corresponding to the matching backup biometric template to the electronic device 402.

The electronic device 402 may also provide personal identifying information (PII) of a patient to a payer 408. The payer 408 may receive the PII of the patient and identify one or more candidate clients on a payer client database 436 corresponding to similar PII previously stored (e.g., at enrollment of the PII) on a PII database 434. The payer 408 may send a list of candidate clients (e.g., a list of client numbers) to the storage device 406. The payer 408 may also generate a first and second token using the token module 438. The payer 408 may send the first token to the electronic device 402 and the second token to the storage device 406. The first and second token may be used to verify a patient and/or electronic device 402 with the list of candidate clients.

The storage device 406 may provide one or more encrypted backup biometric templates to the electronic device 402. The encrypted biometric templates may correspond to the list of candidate clients provided by the payer 408. The electronic device 402 may use the backup private key 440 and identify the correct encrypted backup biometric template by decrypting the encrypted backup biometric template using the backup private key 440. The electronic device 402 may identify which backup biometric template is successfully decrypted and provide an indication to the storage device 406 which of the encrypted backup biometric templates matches the backup key pair. Additionally, the electronic device 402 or storage device 406 may verify that the additional biometric data matches the decrypted biometric template by comparing the additional biometric data and the decrypted backup biometric template.

In some configurations, the storage device 406 may perform additional verification that the electronic device 402 has identified and decrypted the correct encrypted backup biometric template. For example, the storage device 406 may send a challenge response (e.g., a random nonce) to the electronic device 402 asking for additional verification that the electronic device 402 has decrypted the correct backup biometric template. Additionally, the electronic device 402 may generate a new encrypted backup biometric template based on the additional biometric data using the backup public key 426 and send the new encrypted backup biometric template to the storage device 406 for later use. This procedure of generating a challenge response and generating a new encrypted backup biometric template may reduce future cases of false authentication by ensuring that only the same patient may obtain future access to privacy sensitive information 446 associated with a backup encrypted biometric template stored on the storage device 406.

Once the correct backup biometric template is identified, the electronic device 402 may request privacy sensitive information 446 from the records database 430. The storage device 406 may provide the privacy sensitive information 446 to the electronic device 402 over the network 410 or grant access to the electronic device 402 to access the privacy sensitive information 446 over the network 410.

By distributing backup biometric information to multiple entities over the network 410, privacy sensitive information 446 may be difficult to obtain without proper authorization of a patient. For example, even with enrolling PII linked to privacy sensitive information 446 with a payer 408, a patient or other entity would be unable to obtain privacy sensitive information 446 without also obtaining additional biometric data obtained from the patient. Therefore, someone other than the patient would be unable to obtain the privacy sensitive information 446 by just providing PII of the patient. Further, a patient without access to a smart card may still be able to obtain up-to-date and accurate privacy sensitive information 446 (e.g., medical records) without sacrificing complete anonymity.

Moreover, by distributing the public key 426, private key 440 and encrypted backup biometric template among different entities, and only providing privacy sensitive information 446 to an electronic device 402 after verifying additional biometric data and a backup private key 440, it is more difficult to obtain privacy sensitive information 446 unless the security of three different entities (e.g., verifier 404, payer 408, storage device 406) are compromised. Therefore, privacy sensitive information 446 is adequately protected even while allowing a patient access to privacy sensitive information 446 without access to a smart card.

In another configuration, rather than distributing a backup private key 440 exclusively to the verifier 404, the electronic device 402 may distribute multiple partial private keys among multiple entities of the system 400. For example, the electronic device 402 may distribute a partial private key to the verifier 404 and/or storage device 406 in addition to the payer 408. Thus, the electronic device 402 may be unable to decrypt the encrypted backup biometric template without first verifying with a verifier 404, storage device 406 and/or a payer 408 by providing additional biometric data, PII or other form of verification. Thus, even if an entity (or two) within the system 400 is compromised, the privacy sensitive information 446 may still be protected.

Figure 5:
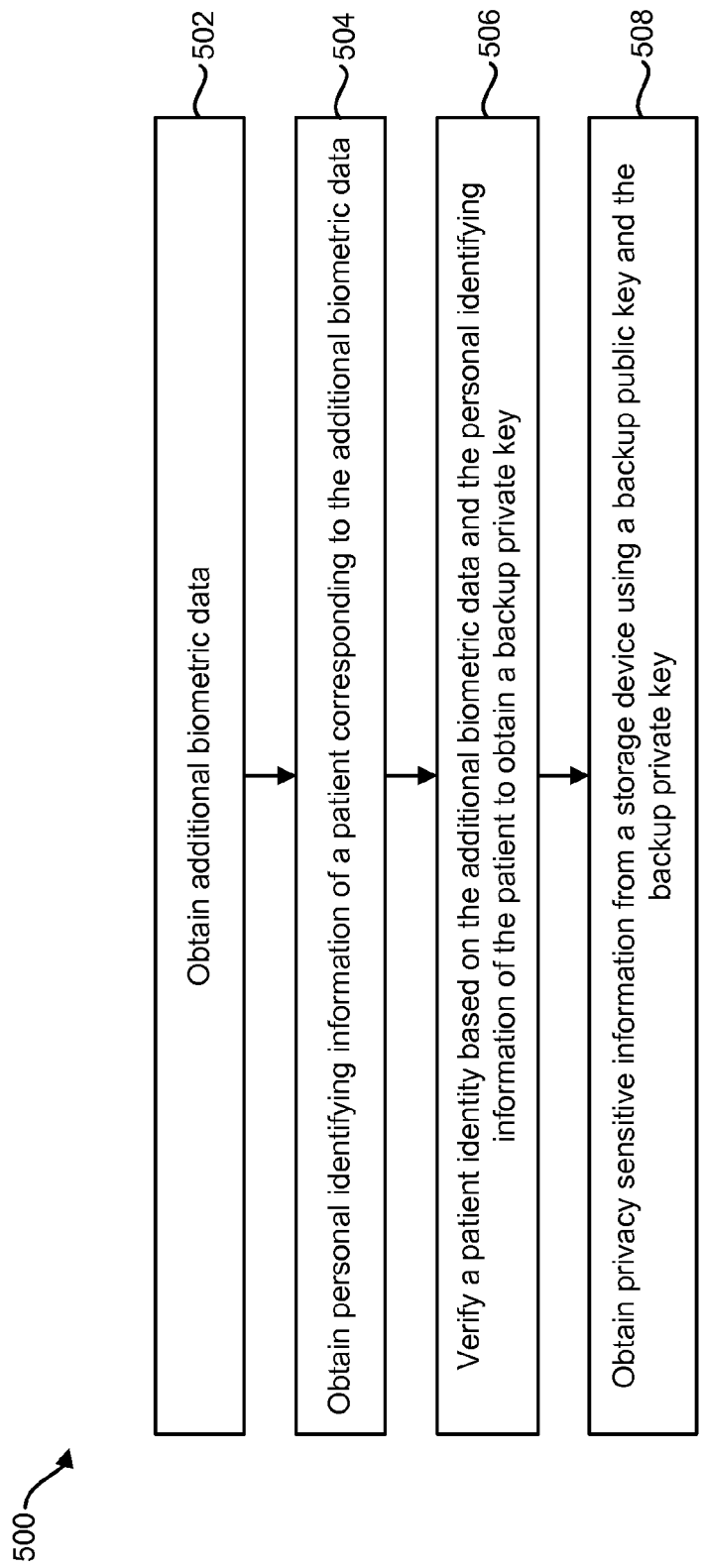
FIG. 5 is a flow diagram illustrating one configuration of a method for authenticating additional biometric data using backup biometric information.

FIG. 5 is a flow diagram illustrating one configuration of a method 500 for authenticating additional biometric data using backup biometric information. The method 500 may be performed by an electronic device 402 or other computing device.

An electronic device 402 may obtain 502 additional biometric data. Obtaining 502 additional biometric data may be performed using similar devices and techniques as obtaining 202 biometric data described above in connection with FIG. 2. The electronic device 402 may also obtain 504 personal identifying information (PII) of a patient corresponding to the additional biometric data. The PII of a patient may be obtained at the same time as the additional biometric data is obtained.

The electronic device 402 may verify 506 a patient identity based on the additional biometric data and the PII of the patient to obtain a backup private key 440. Verifying 506 the patient identity may be performed using the electronic device 402. Further, one configuration of verifying 506 a patient identity is described in more detail below in connection with FIG. 6.

The electronic device 402 may obtain 508 privacy sensitive information 446 from a storage device 406 using a backup public key 426 and the backup private key 440. Obtaining 508 privacy sensitive information 446 from the storage device may be performed in response to verifying 506 the patient identity. Further, one configuration of obtaining 508 privacy sensitive information 446 is described in more detail below in connection with FIG. 7.

Figure 6:
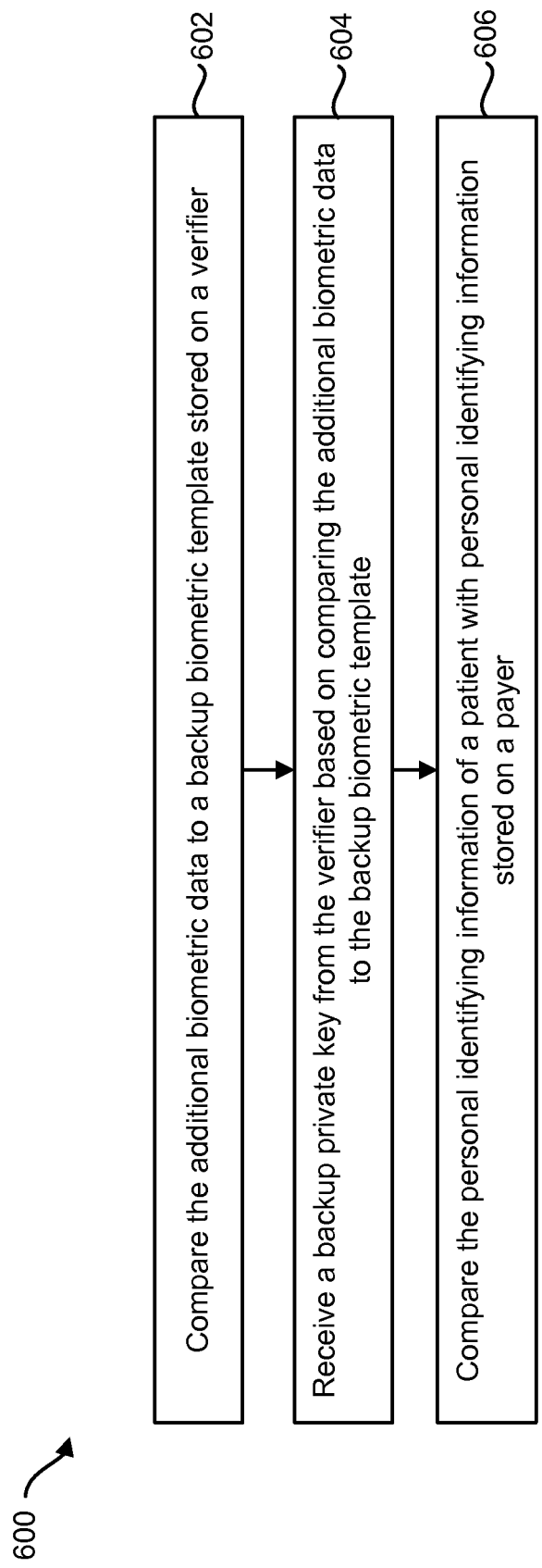
FIG. 6 is a flow diagram illustrating one configuration of a method for verifying a patient identity using backup biometric information.

FIG. 6 is a flow diagram illustrating one configuration of a method 600 for verifying a patient identity using backup biometric information. In one configuration, the method 600 may be performed by an electronic device 402 or other computing device. Further, it is noted that the method 600 of FIG.

6 may be one configuration of verifying 506 a patient identity based on the additional biometric data and the PII of the patient to obtain a backup public key 426 and a backup private key 440 described above in connection with FIG. 5.

The electronic device 402 may compare 602 the additional biometric data to a backup biometric template stored on a verifier 404. The backup biometric template may be unencrypted and stored on the verifier 404 during enrollment of backup biometric information. Comparing 602 the additional biometric data to the backup biometric template may include comparing the additional biometric data to all of the backup biometric templates stored on the verifier 404.

The electronic device 402 may receive 604 a backup private key 440 from the verifier 404 based on comparing the additional biometric data to the backup biometric template. The backup private key 440 may be received in response to verifying a match between the additional biometric data and a corresponding backup biometric template in the backup biometric database 424.

The electronic device 402 may compare 606 the personal identifying information (PII) of a patient with PII stored on a payer 408. The stored PII may be stored on the payer 408 at the time of enrolling the backup biometric information. The PII of the patient may be provided by the electronic device 402 when verifying a patient identity with the payer 408.

Figure 7:
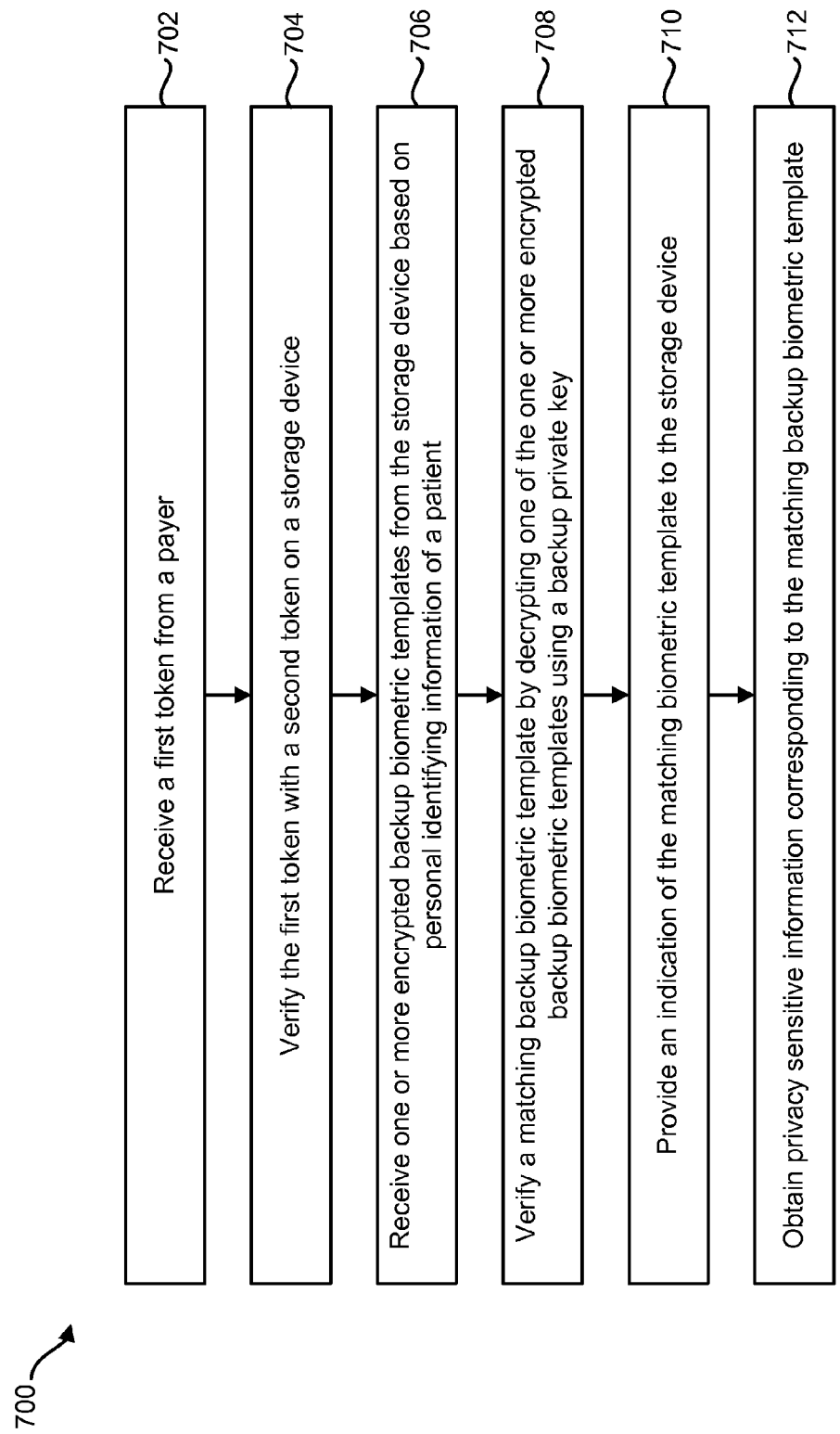
FIG. 7 is a flow diagram illustrating one configuration of a method for obtaining privacy sensitive information using backup biometric information.

FIG. 7 is a flow diagram illustrating one configuration of a method 700 for obtaining privacy sensitive information 446 using backup biometric information. In one configuration, the method 700 may be performed by an electronic device 402 or other computing device. Further, it is noted that the method 700 of FIG. 7 may be one configuration of obtaining 508 privacy sensitive information from a storage device 406 using the backup public key 426 and the backup private key 440 described above in connection with FIG. 5.

The electronic device 402 may receive 702 a first token from a payer 408. The first token may be received 702 upon verification of personal identifying information (PII) provided to the payer 408 from the electronic device 402. Specifically, the first token may be received based on a match between PII of a patient and a list of candidate clients stored on the payer 408. The electronic device 402 may verify 704 the first token with a second token on the storage device 406. The second token may be sent to the storage device 406 from the payer 408. The second token and the first token may be identical.

The electronic device 402 may receive 706 one or more encrypted backup biometric templates from the storage device 406 based on PII of a patient. For example, the payer 408 may provide a list of candidate clients based on evaluating the PII of a patient. The storage device 406 may identify encrypted backup biometric templates corresponding to the list of candidate clients and provide encrypted backup biometric templates to the electronic device 402.

The electronic device 402 may verify 708 a matching backup biometric template by decrypting one of the one or more encrypted backup biometric templates using a backup private key 440. The backup private key 440 may be provided by the verifier 404 and used to identify a matching encrypted biometric template with additional biometric data provided by a patient. The electronic device 402 may provide 710 an indication of the matching biometric template to the storage device 406. Providing 710 an indication may include sending the decrypted backup biometric template and additional biometric data to the storage device 406. In another configuration, providing an indication may include matching the decrypted backup biometric template and the additional biometric data on the electronic device 402 and sending a signal confirming the matching backup biometric template to a storage device 406.

The electronic device 402 may obtain 712 privacy sensitive information 446 corresponding to the matching backup biometric template. Obtaining 712 privacy sensitive information 446 may include receiving privacy sensitive information 446 from the storage device 406 or being granted access to the privacy sensitive information 446 on a records database 430 on the storage device 406.

In some configurations, in addition to obtaining privacy sensitive information 446, the electronic device 402 may proceed to program an additional smart card by generating a new public key, a new private key and a new biometric template based on the additional or backup biometric information. The new public/private key pair may be stored on the smart card while the new biometric template may be encrypted and stored on the storage device 406, verifier 404 or other entity. Thus, in addition to obtaining privacy sensitive information 446, the backup biometric information may also be used to generate and program a new smart card for later obtaining access to privacy sensitive information 446 on the storage device 406.

Figure 8:
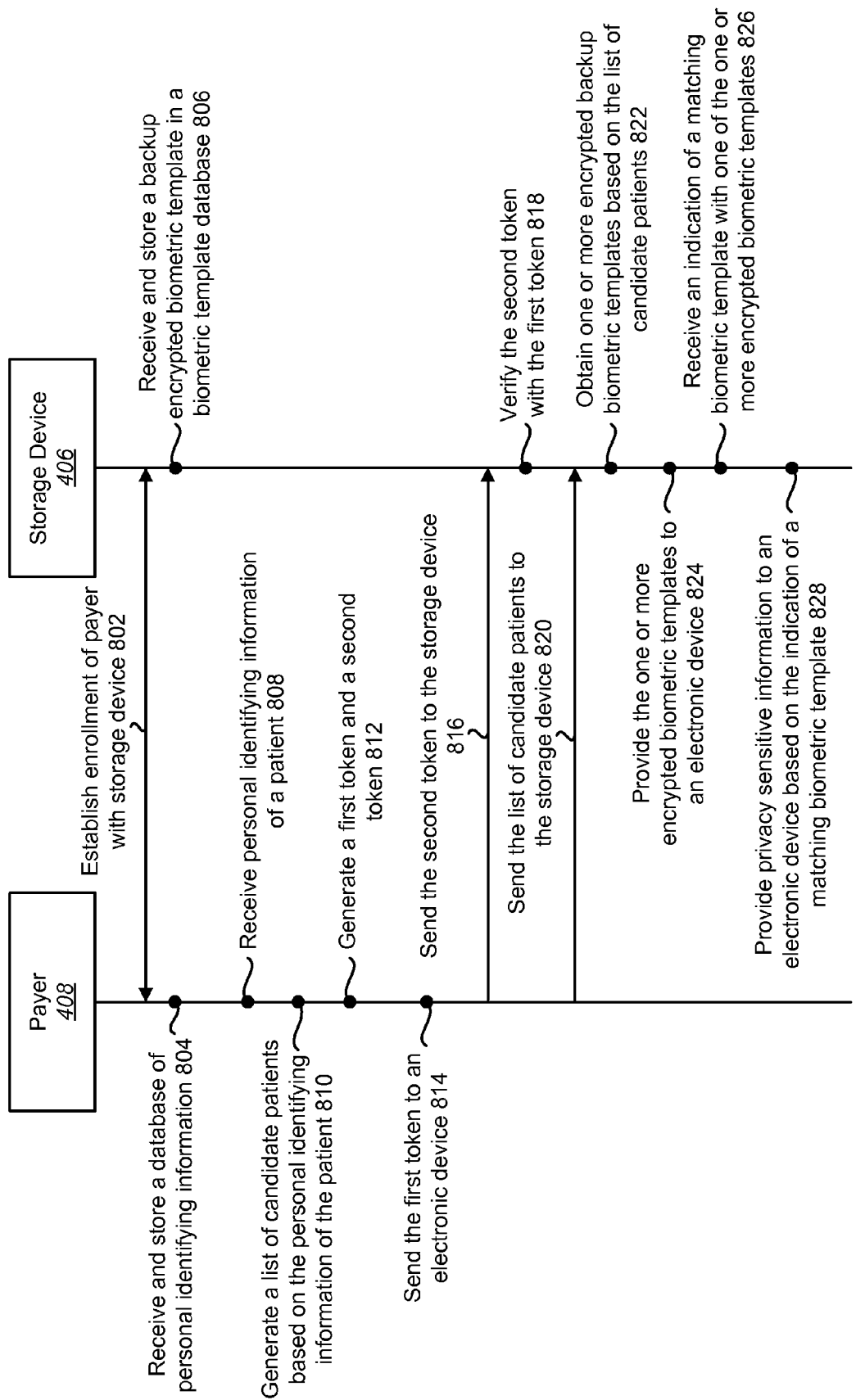
FIG. 8 is a thread diagram illustrating an example of authenticating backup biometric information between a verifier and a payer.

FIG. 8 is a thread diagram illustrating an example of authenticating backup biometric information between a verifier 404 and a payer 408. A payer 408 and a storage device 406 may establish 802 enrollment of the payer 408 with the storage device 406. Establishing 802 enrollment of the payer 408 and the storage device 406 may include establishing a trusted relationship and/or linking client identifiers (e.g., from the payer client database 436) with patient identifications 444 on the storage device 406.

The payer 408 may receive and store 804 a database of personal identifying information (PII) 434. The storage device 406 may receive and store 806 a backup encrypted biometric template in a biometric template database 428. Receiving and storing 804, 806 the database of PII and the backup encrypted biometric template may be performed as part of enrolling biometric information. Further, the payer 408 may receive and store 804 the PII at the same time as the storage device 406 receives and stores 806 a backup encrypted biometric template.

The payer 408 may receive 808 PII of a patient. The PII of a patient may be subsequently provided by a patient corresponding to the PII originally stored on the PII database 434. The payer 408 may generate 810 a list of candidate patients based on the PII of the patient. The list of candidate patients may be a list of patients that match the PII of the patient provided to the payer 408. In some cases, the list of candidate patients may include one candidate that matches the PII of the patient and multiple candidates that do not match, but are included within the list of candidate patients to protect the anonymity of a patient.

The payer 408 may generate 812 a first token and a second token. In some configurations, the first and second tokens are matching or identical. The payer 408 may send 814 the first token to an electronic device 402. The payer 408 may send 816 the second token to the storage device 406. The storage device 406 may verify 818 the second token with the first token. The payer 408 may also send 820 the list of candidate patients to the storage device 406. The payer 408 may send 820 the list of candidate patients concurrently with the second token or upon verification of the second token with the first token.

The storage device 406 may obtain 822 one or more encrypted backup biometric templates based on the list of candidate patients. In some cases, the storage device 406 obtains 822 all of the encrypted backup biometric templates that correspond to candidate patients that are enrolled with the storage device 406. The storage device 406 may provide 824 the one or more encrypted biometric templates to an electronic device 402. The storage device 406 may receive 826 an indication of a matching biometric template with one of the one or more encrypted biometric templates. The storage device 406 may provide 828 privacy sensitive information 446 to an electronic device 402 based on the indication of a matching biometric template.

Figure 9:
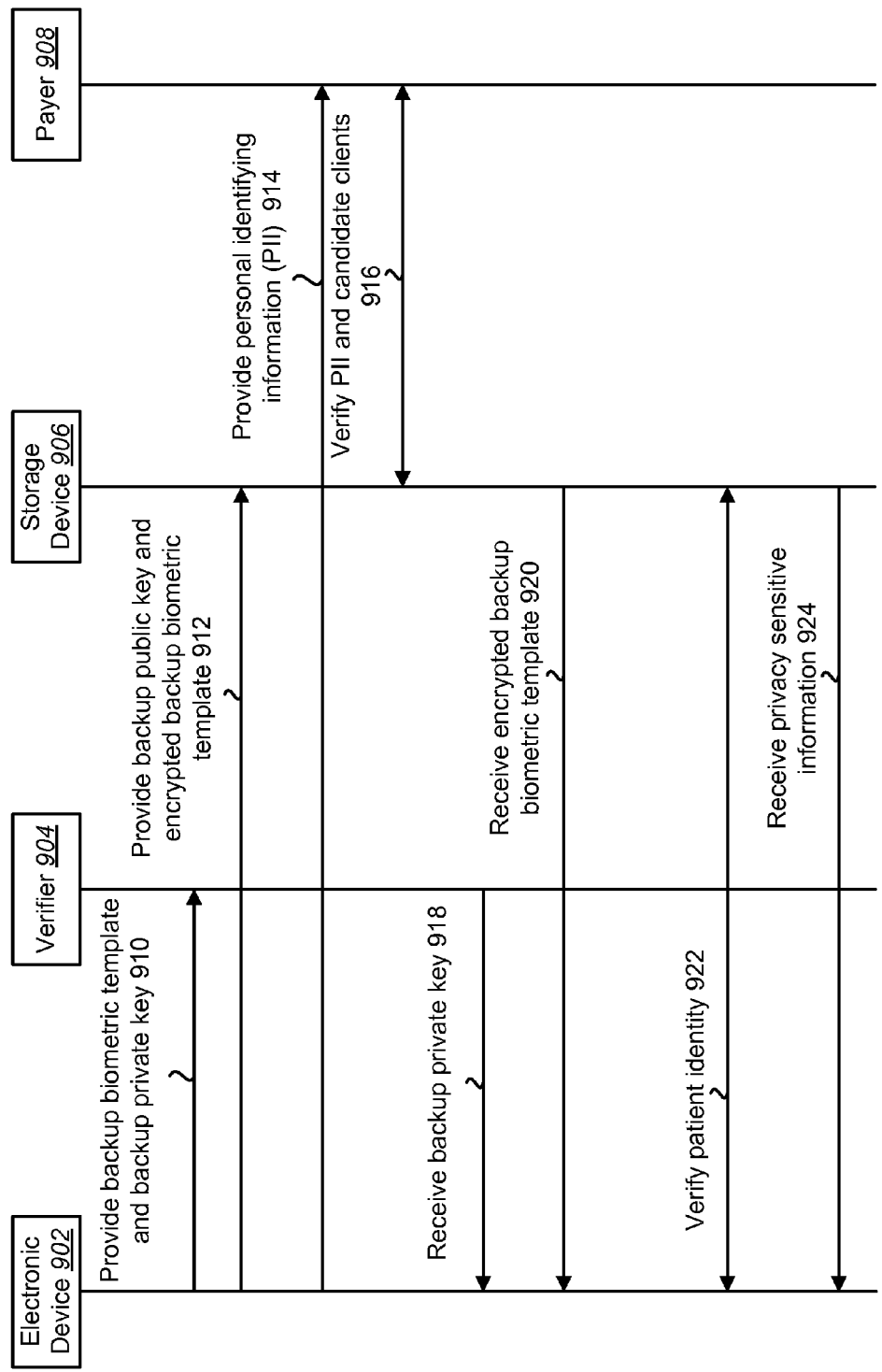
FIG. 9 is a thread diagram illustrating an example of performing anonymous authentication using backup information.

FIG. 9 is a thread diagram illustrating an example of performing anonymous authentication using backup information. An electronic device 902 may provide 910 a backup biometric template and a backup private key to a verifier 904. The electronic device 902 may also provide 912 a backup public key and an encrypted backup biometric template to a storage device 906. The electronic device 902 may further provide 914 personal identifying information (PII) a payer 908. Distributing the backup biometric information and the PII to the verifier 904, storage device 906 and the payer 908 may be part of enrolling the backup biometric information. Further, the storage device 906 and the payer 908 may verify 916 the PII and candidate clients stored on the payer 908.

The electronic device 902 may receive 918 the backup private key from the verifier 904. The electronic device 902 may receive 920 the encrypted backup biometric template from the verifier 904. Further, the electronic device 902 may verify 922 a patient identity with the storage device 906. Verifying 922 a patient identity with the storage device 906 may include verifying a backup public key with a backup private key and comparing additional biometric data (e.g., subsequently obtained biometric data) with the backup biometric template stored on the verifier 904 and the encrypted backup biometric template stored on the storage device 906. Further, the electronic device 902 may receive 924 privacy sensitive information from the storage device 906. The privacy sensitive information may be received based on the results of the anonymous authentication.

Figure 10:
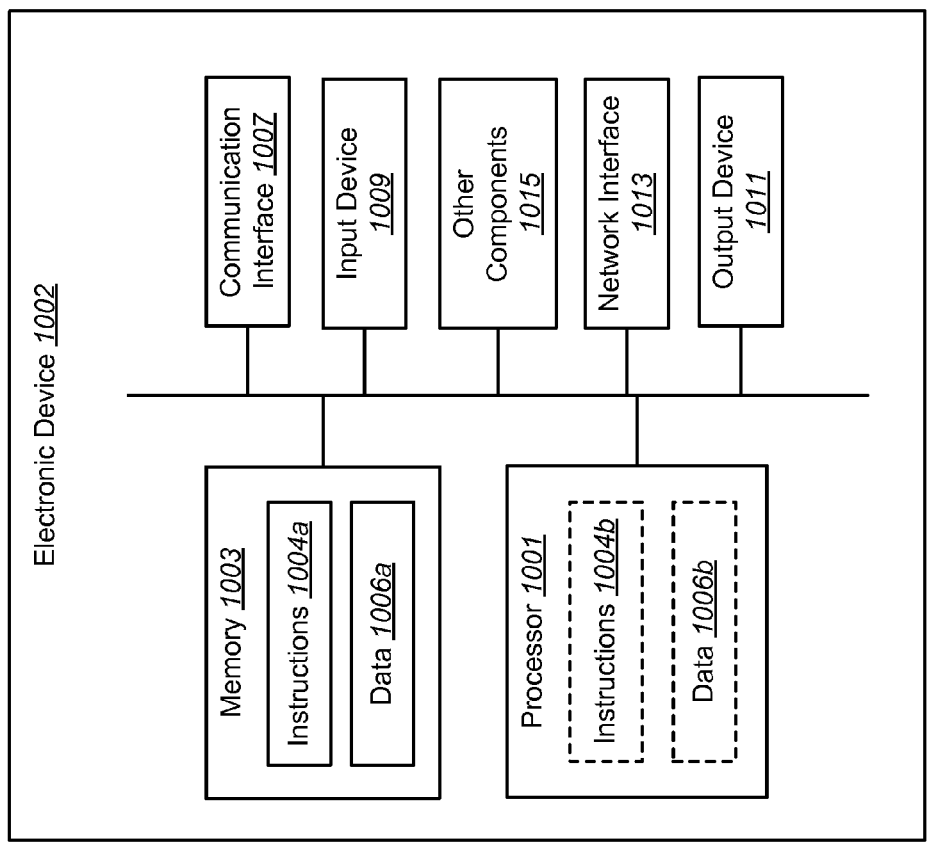
FIG. 10 is a block diagram illustrating various components that may be utilized in an electronic device.

FIG. 10 is a block diagram illustrating various components that may be utilized in an electronic device, verifier, payer and/or a storage device. Although only one electronic device 1002 is shown, the configurations herein may be implemented in a distributed system using many computer systems. The electronic device 1002 may include the broad range of digital computers, including microcontrollers, hand-held computers, personal computers, servers, mainframes, supercomputers, minicomputers, workstations and any variation or related device thereof.

The electronic device 1002 is shown with a processor 1001 and memory 1003. The processor 1001 may control the operation of the electronic device 1002 and may be embodied as a microprocessor, a microcontroller, a digital signal processor (DSP) or other device known in the art. The processor 1001 typically performs logical and arithmetic operations based on program instructions 1004a stored within the memory 1003. The instructions 1004a in the memory 1003 may be executable to implement the methods described herein.

The electronic device 1002 may also include one or more communication interfaces 1007 and/or network interfaces 1013 for communicating with other electronic devices. The communication interface(s) 1007 and the network interface(s) 1013 may be based on wired communication technology and/or wireless communication technology.

The electronic device 1002 may also include one or more input devices 1009 and one or more output devices 1011. The input devices 1009 and output devices 1011 may facilitate user input/user output. Other components 1015 may also be provided as part of the electronic device 1002.

Data 1006a and instructions 1004a may be stored in the memory 1003. The processor 1001 may load and execute instructions 1004b from the instructions 1004a in memory 1003 to implement various functions. Executing the instructions 1004a may involve the use of the data 1006b that is loaded from the memory 1003. The instructions 1004a are executable to implement one or more of the processes or configurations shown herein, and the data 1006a may include one or more of the various pieces of data described herein.

The memory 1003 may be any electronic component capable of storing electronic information. The memory 1003 may be embodied as random access memory (RAM), read-only memory (ROM), magnetic disk storage media, optical storage media, flash memory devices in RAM, on-board memory included with the processor, EPROM memory, EEPROM memory, an ASIC (Application Specific Integrated Circuit), registers, and so forth, including combinations thereof.

As used herein, the term "determining" encompasses a wide variety of actions and, therefore, "determining" can include calculating, computing, processing, deriving, investigating, looking up (e.g., looking up in a table, a database or another data structure), ascertaining and the like. In addition, "determining" can include receiving (e.g., receiving information), accessing (e.g., accessing data in a memory) and the like. Further, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 3, 4, 6, 7 and 8, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for performing anonymous authentication by an electronic device, comprising:
   obtaining biometric data;
   enrolling biometric information based on the biometric data;
   generating backup biometric information based on the biometric data, the backup biometric information comprising a backup biometric template;
   generating a backup public key and a backup private key; and
   enrolling the backup biometric information, wherein enrolling the backup biometric information comprises distributing the backup biometric template, the backup public key and the backup private key among different entities, wherein enrolling the backup biometric information comprises:
   sending the backup biometric template and the backup private key to a verifier;
   sending a backup public key and an encrypted backup biometric template based on the backup biometric template to a storage device; and
   sending personal identifying information (PII) corresponding to the backup biometric data to a payer, wherein the verifier is implemented by a first computing device, the storage device is implemented by a second computing device, the payer is implemented by a third computing device, and wherein the first computing device, the second computing device and the third computing device are separate computing devices in electronic communication via a computer network.

2. The method of claim 1, further comprising:
   obtaining additional biometric data;
   obtaining personal identifying information (PII) of a patient corresponding to the additional biometric data; and
   verifying a patient identity based on the additional biometric data and the PII of the patient.

3. The method of claim 2, wherein verifying the patient identity comprises:
   comparing the additional biometric data to the backup biometric template stored on the verifier; and
   receiving the backup private key from the verifier based on comparing the additional biometric data to the backup biometric template.

4. The method of claim 2, wherein verifying the patient identify comprises comparing the PII of the patient with PII stored on a payer.

5. The method of claim 2, further comprising obtaining privacy sensitive information from a storage device based on verifying the patient identity.

6. The method of claim 5, wherein obtaining privacy sensitive information comprises:
   receiving a first token from a payer; and
   verifying the first token with a second token on the storage device.

7. The method of claim 6, further comprising:
   receiving one or more encrypted biometric templates from the storage device based on the PII of the patient; and
   verifying a matching backup biometric template by decrypting one of the one or more encrypted biometric templates using the backup private key.

8. The method of claim 7, further comprising:
   providing an indication of the matching biometric template to the storage device; and
   obtaining privacy sensitive information corresponding to the matching backup biometric template.

9. The method of claim 1, wherein generating backup biometric information comprises generating a first partial backup private key and a second partial backup private key.

10. The method of claim 9, wherein enrolling the backup biometric information comprises distributing the first partial backup private key to a verifier and the second partial backup private key to a payer.

11. An electronic device for performing anonymous authentication, comprising:
    a hardware processor;
    memory in electronic communication with the processor; and instructions stored in memory, the instructions being executable to:
obtain biometric data;
enroll biometric information based on the biometric data;
generate backup biometric information based on the biometric data, the backup biometric information comprising a backup biometric template;
generate a backup public key and a backup private key; and
enroll the backup biometric information, wherein enrolling the backup biometric information comprises distributing the backup biometric template, the backup public key and the backup private key among different entities, wherein the instructions being executable to enroll the backup biometric information further comprise instructions being executable to:
send the backup biometric template and the backup private key to a verifier;
send a backup public key and an encrypted backup biometric template based on the backup biometric template to a storage device; and
send personal identifying information (PII) corresponding to the backup biometric data to a payer, wherein the verifier is implemented by a first computing device, the storage device is implemented by a second computing device, the payer is implemented by a third computing device, and wherein the first computing device, the second computing device and the third computing device are separate computing devices in electronic communication via a computer network.

12. The electronic device of claim 11, wherein the instructions are further executable to:
obtain additional biometric data;
obtain personal identifying information (PII) of a patient corresponding to the additional biometric data; and
verify a patient identity based on the additional biometric data and the PII of the patient.

13. The electronic device of claim 12, wherein the instructions are further executable to obtain privacy sensitive information from a storage device based on verifying the patient identity.

14. A computer-program product for performing anonymous authentication, embodied in a non-transitory computer-readable medium having instructions thereon, the instructions comprising:
code for causing an electronic device to obtain biometric data;
code for causing the electronic device to enroll biometric information based on the biometric data;
code for causing the electronic device to generate backup biometric information based on the biometric data, the backup biometric information comprising a backup biometric template;
code for causing the electronic device to generate a backup public key and a backup private key; and
code for causing the electronic device to enroll the backup biometric information, wherein enrolling the backup biometric information comprises distributing the backup biometric template, the backup public key and the backup private key among different entities, wherein the code for causing the electronic device to enroll the backup biometric information further comprises:
code for causing the electronic device to send the backup biometric template and the backup private key to a verifier;
code for causing the electronic device to send a backup public key and an encrypted backup biometric template based on the backup biometric template to a storage device; and
code for causing the electronic device to send personal identifying information (PII) corresponding to the backup biometric data to a payer, wherein the verifier is implemented by a first computing device, the storage device is implemented by a second computing device, the payer is implemented by a third computing device, and wherein the first computing device, the second computing device and the third computing device are separate computing devices in electronic communication via a computer network.

15. The computer-program product of claim 14, the instructions further comprising:
code for causing the electronic device to obtain additional biometric data;
code for causing the electronic device to obtain personal identifying information (PII) of a patient corresponding to the additional biometric data; and
code for causing the electronic device to verify a patient identity based on the additional biometric data and the PII of the patient.

16. The computer-program product of claim 15, the instructions further comprising code for causing the electronic device to obtain privacy sensitive information from a storage device based on verifying the patient identity.

* * * * *